United States Patent [19]

Dockser

[11] Patent Number: 5,649,174

[45] Date of Patent: Jul. 15, 1997

[54] MICROPROCESSOR WITH INSTRUCTION-CYCLE VERSUS CLOCK-FREQUENCY MODE SELECTION

[75] Inventor: Kenneth A. Dockser, San Jose, Calif.

[73] Assignee: VLSI Technology Inc., San Jose, Calif.

[21] Appl. No.: 353,480

[22] Filed: Dec. 9, 1994

[51] Int. Cl.[6] .................................. G06F 1/08; G06F 9/30
[52] U.S. Cl. ............................................. 395/556; 395/376
[58] Field of Search ..................................... 395/375, 550, 395/775; 364/231.8, 232.8, 232.9, 238, 247, 258, 259, 259.5, 259.9, 262.4, 262.8, 262.5, 262.9, 263, 270, 270.3, 271.6

[56] References Cited

U.S. PATENT DOCUMENTS

| 3,656,123 | 4/1972 | Carnevale et al. | 340/172.5 |
| 4,128,880 | 12/1978 | Cray, Jr. | 364/200 |
| 4,365,311 | 12/1982 | Fukunaga et al. | 364/900 |
| 5,269,007 | 12/1993 | Hanawa et al. | 395/375 |

*Primary Examiner*—Thomas M. Heckler
*Assistant Examiner*—Dennis M. Butler
*Attorney, Agent, or Firm*—Clifton L. Anderson

[57] ABSTRACT

A microprocessor provides for a single-cycle and a dual-cycle instruction mode. In the single-cycle mode, certain instructions, e.g., a "shift plus add" instruction, are performed in a single cycle with a relatively low clock rate. In the dual-cycle mode, the shift is performed in the first cycle and the add is performed in the second cycle with a relatively high clock rate. In the dual-cycle mode, a cycle can be dropped if the shift amount is zero or one of the operands is zero. A system designer and/or a programmer can select the mode to maximize throughput.

10 Claims, 3 Drawing Sheets

| SELECT MODE | SINGLE-CYCLE | DUAL-CYCLE | | |
|---|---|---|---|---|
| SELECT CLOCK RATE | LOW | HIGH | | |
| RECEIVE SHIFT + ADD INSTRUCTION | YES | YES | | |
| ZERO DETECT? | NONE | SHIFT≠0 ADD≠0 | SHIFT=0 ADD≠0 | SHIFT≠0 ADD=0 |
| FIRST CYCLE | SHIFT & ADD | SHIFT | ADD | SHIFT |
| SECOND CYCLE | NONE | ADD | NONE | NONE | t

*Figure 2*

MICROPROCESSOR WITH INSTRUCTION-CYCLE VERSUS CLOCK-FREQUENCY MODE SELECTION

BACKGROUND OF THE INVENTION

The present invention relates to computers and, more particularly, to microprocessors. A major objective of the present invention is to provide for more efficient program execution.

Much of modern progress is associated with advances in computer performance. Recent computers typically use one or more microprocessors to execute programmed operations. Each microprocessor design is characterized by the set of instructions it can recognize and execute. The instruction sets of early microprocessors included a relatively small number of simple instructions. Accordingly, many instructions could be required to implement operations such as addition and multiplication. Succeeding generations of microprocessors accommodated more instructions and more complex instructions, thus reducing program length as well as programming time.

To provide for synchronous operation, instructions progress according to fixed-period instruction cycles. Simple instructions can be performed in a single instruction cycle, while more complex instructions may require multiple instruction cycles. Most instructions can be completed before the end of a cycle; the remainder of the cycle is, in a sense, wasted.

This wasted cycle time can be minimized at the microprocessor design stage by selecting a short instruction cycle. However, a shorter instruction cycle increases the number of instructions that must be performed in multiple cycles. There is overhead involved in managing multi-cycle instructions. This overhead, in addition to that associated generally with larger instruction sets, results in increased microprocessor complexity and size. The weight of industry opinion is that these increases in size and complexity more than offset the advantages of adding more multi-cycle instructions to the instruction sets of microprocessors.

Increasingly, processors are designed as "reduced instruction-set computers" (RISC). In the RISC approach, a relatively small set of, preferably single-cycle, instructions is used. This approach takes better advantage of integrated circuit real estate and generally improves processor throughput. Disadvantageously, the number of instructions required to implement an operation is increased. However, compilers have been developed that can generate suitable instructions from a high-level programming language. This relieves the programmer of the burden of generating the long program code required by the small instruction set.

Preferably, all or most instructions are executed within a single instruction cycle. This minimizes the circuitry required to manage instructions of varying length. A disadvantage is that the instruction cycle must be matched to the longest single-cycle instructions. Instructions that could be executed in less time still consume an entire cycle. Overall processor throughput is thus closely tied to time required to perform the longest single-cycle instruction.

In some cases, a microprocessor architect can choose between: 1) executing an operation using a single instruction to save cycles; and 2) executing an operation using multiple instructions so that a shorter instruction cycle can be used. Shift and zero detection are two relatively short operations that can be optionally combined with various other operations, e.g., arithmetic and logic operations. Shift is used, for example, in conjunction with addition to facilitate multiplications; zero detection is used as a branch condition, for example, to avoid a subsequent division by zero.

Because of the frequency of its use, multiplication plus zero detection can define a useful single instruction. Multiplication is a relatively long instruction, but zero detection can be achieved in a relatively short time. For example, the bits of a number can be NORed together so that a high output indicates a zero product while a low output indicates a non-zero product. Even though the additional time required for the zero detection is short, it can have a large impact on throughput if the instruction cycle is lengthened to permit its execution within a single multiplication cycle. In that case, the time required for zero detection is added to all instructions whether or not they involve a zero detection. The alternative is to perform the multiplication and the zero detection as separate instructions. However, this is wasteful because entire cycles must be devoted to the zero detections, which should only consume a fraction of a cycle.

Likewise shifts are frequently used with data processing operations such as addition, subtraction, AND, XOR, and others. Combining shift with these operations in a single instruction increases the throughput of such instructions. However, the longer instruction cycle required increases the execution of other instructions that do not involve a shift. What is needed is an approach that minimizes the practical tradeoffs between the one cycle and the two cycle implementations of such combinations of operations.

SUMMARY OF THE INVENTION

In accordance with the present invention, a microprocessor system provides for selection between a single-cycle mode and a dual-cycle mode. Certain instructions that are performed in one instruction cycle in the single-cycle mode are performed in two instruction cycles in the dual-cycle mode. These instructions can involve two operations, one of which is relatively time consuming (e.g., addition) and the other which is less time consuming (e.g., shift or zero detection). A relatively low clock frequency is selected in single-cycle mode to allow for completion of both operations required by the instruction. In dual cycle mode, a higher clock frequency is selected since only one operation is required per cycle.

Representative instructions include: 1) an instruction calling for a non-zero shift followed by addition to a non-zero number; and 2) an instruction requiring an addition followed by a zero-sum detection. In either case, both operations of an instruction are performed in one cycle in single-cycle mode. In dual-cycle mode, the operations of an instruction are performed in respective sequential cycles.

A further enhancement involves performing a two-operation instruction in dual-cycle mode in one cycle where at least one operation has a result equal to an operand. For example, if an instruction calls for a zero shift (or a shift of zero), the shift can be skipped. If an instruction calls for a non-zero shift followed by an addition to a zero operand, the addition can be skipped.

A microprocessor incorporating this invention can include a register file, a first operator unit (e.g., a barrel shifter), a second operator unit (e.g., an ALU), an instruction decoder, and a clock multiplexer (or on-chip multi-frequency clock) for selecting between high and low frequency clock signals. Routing of data between the register file and the operator units can be determined by the setting of multiplexers controlled by the instruction decoder. Alternatively, clock generation and frequency control can be entirely "off chip", requiring only a single clock input to the microprocessor. In this case, clock selection is still performed by the incorporating microprocessor system.

When in single-cycle mode, the instruction decoder causes the clock means to select a slow clock frequency and routes data from the register file to the first operator unit to the second operator unit and back to the register file. When in dual-cycle mode, the instruction decoder routes data from the register file to the first operator unit and back to the register file; in a second cycle the data is routed from the register file to the second operator unit and back to the register file. In special cases, such as zero shift or add zero, the respective cycle can be omitted in dual-cycle mode.

By providing for the two modes of operation, the microprocessor can maximize throughput in more situations. The single-cycle mode can provide faster throughput when executing programs that frequently call for shifts before arithmetic and logical operations. Programs requiring relatively few shifts can be executed faster in dual-cycle mode. The invention can save cycles during dual-cycle operation in special cases, further augmenting throughput. These and other features and advantages of the present invention are apparent from the description below with reference to the following drawings.

BRIEF DESCRIPTION OF THE DRAWINGS

FIG. 2 is a flow table of a method employed by the microprocessor of FIG. 1.

DESCRIPTION OF THE PREFERRED EMBODIMENTS

Figure 1:
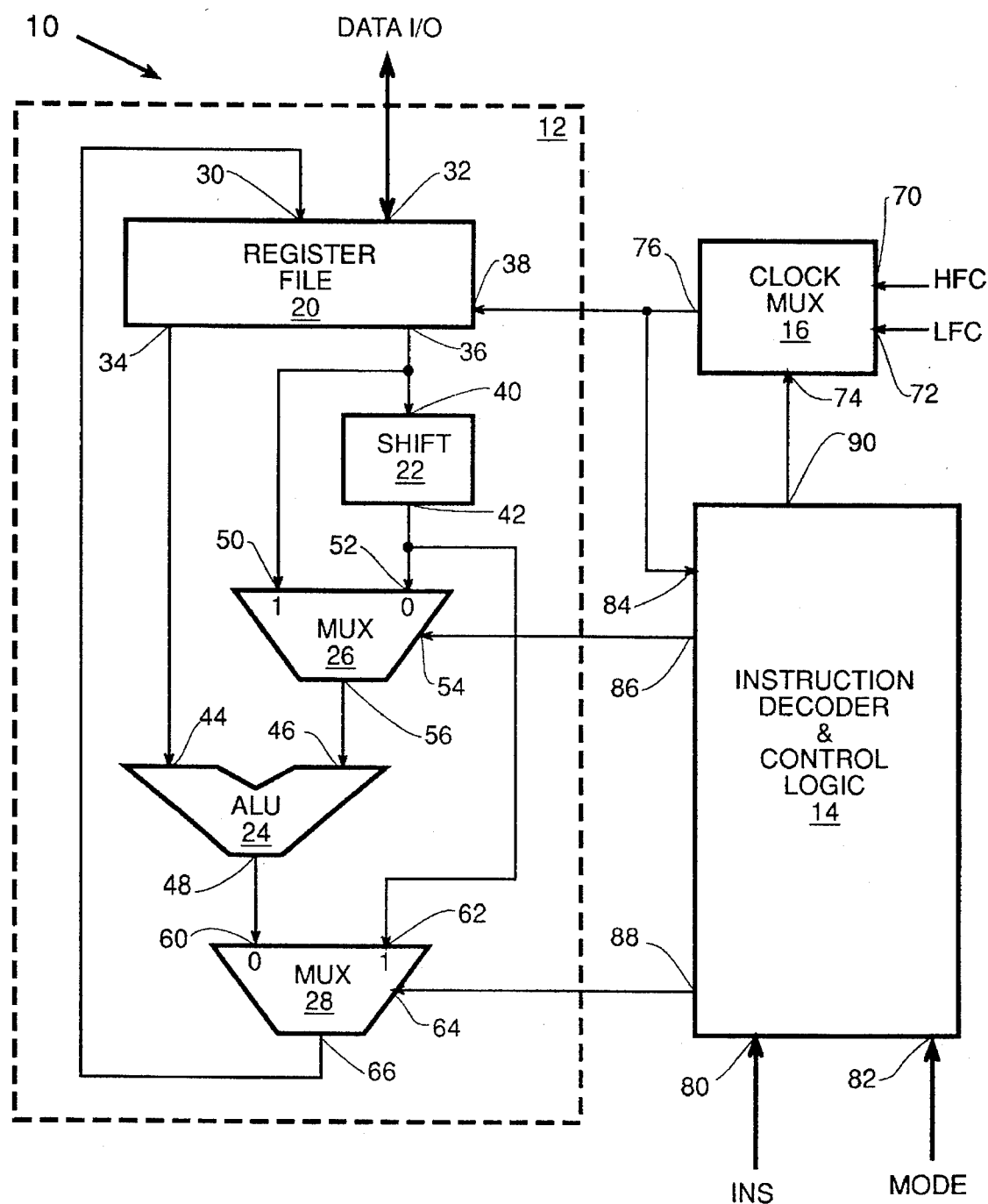
FIG. 1 is a schematic diagram of a microprocessor in accordance with the present invention.

In accordance with the present invention, a microprocessor 10 includes an execution unit 12, an instruction decoder and control logic 14, and a clock multiplexer 16. Execution unit 12 includes a register file 20, a barrel shifter 22, an arithmetic logic unit (ALU) 24, and multiplexers 26 and 28. Clock multiplexer 16 selects between high and low frequency clock signals HFC and LFC generated external to microprocessor 10. Other microprocessor elements, well known to those skilled in the art, are omitted from FIG. 1, including control lines between instruction decoder 14 and execution unit 12.

Register file 20 includes an input 30 for receiving numbers generated within execution unit 12. Register file 20 also includes an input/output port 32 for communicating data to other microprocessor components. Register file 20 has a first output 34 and a second output 36. In addition to these data ports, register file 20 has a clock input 38 connected to clock multiplexer 16 for synchronizing data transfers.

Shifter 22 has one input 40 and one output 42. ALU 24 has two inputs 44 and 46 (to provide for two operands) and one output 48. Input 44 of ALU 24 is connected to the first output 34 of register file 20. Input 40 of shifter 22 is connected to the second output 36 of register file 20. The assignments of inputs and outputs is functional and not tied to a particular hardware bus implementation.

Multiplexer 26 has two data inputs 50 and 52, a control input 54, and a data output 56. Control input 54 is connected to instruction decoder 14, which thus selects the input to be connected to output 56. Data input 50 is connected to second output 36 of register file 20, while data input 52 is connected to output 42 of shifter 22. Output 56 of multiplexer 26 is connected to input 46 of ALU 24.

Multiplexer 28 has two data inputs 60 and 62, a control input 64, and a data output 66. Control input 64 is connected to instruction decoder 14. Data input 60 is connected to output 48 of ALU 24; data input 62 is connected to output 42 of shifter 22. Data output 66 is connected to register file input 30.

Clock multiplexer 16 has two clock inputs 70 and 72, a control input 74, and a clock signal output 76. Control input 74 is connected to instruction decoder 14, which thus controls the clock frequency output from clock multiplexer 16. Clock input 70 is coupled to a relatively high frequency, 100 MHz, clock source, while clock input 72 is coupled to a relatively low frequency, 80 MHz, clock source. Clock multiplexer 16 includes logic to ensure that no glitches (overly short clock phases) appear at its output when switching between clocks of different frequencies. Clock output 76 is coupled to register file clock input 38 and to instruction decoder 14 (to synchronize registers and flags in the instruction decoder itself).

Instruction decoder 14 has an instruction input 80 for receiving instructions INS, a mode selection input 82 for receiving a mode-selection signal MODE, a clock input 84 for receiving the clock signal from clock multiplexer 16, and control outputs 86, 88, 90, for respectively controlling multiplexer 26, multiplexer 28, and clock multiplexer 16. The operation of instruction decoder 14 and, more generally microprocessor 10, is indicated in the flow table of FIG. 2.

Mode-selection signal MODE sets a default operational mode for microprocessor 10. Accordingly, a system designer can hard wire a corresponding pin to a logic high or a logic low level to set the default. Alternatively, the system designer can provide for external control of the default mode. A programmer can then override the default mode by setting a mode flag in instruction decoder 14. In single-cycle mode, instruction decoder 14 commands clock multiplexer 16 to select the relatively low frequency clock LFC. In dual-cycle mode, instruction decoder 14 commands clock multiplexer 16 to select the relatively high frequency clock HFC.

Selected instructions are performed in one cycle in single-cycle mode and in two cycles in dual-cycle mode. Since the illustrated embodiment is a modification of the VY86C060 microprocessor (available from VLSI Technology, Inc., of San Jose, Calif.) which uses an ARM instruction set, the "suitable" instructions are the sixteen data processing instructions of that set. The "shift plus add" instruction is illustrative of this group. Other suitable ALU operations are "AND", "exclusive-OR", "ADD with carry", and "subtraction". It should be noted that the ARM instruction set includes ten other types of instructions for which this invention does not require mode selection.

In single-cycle mode, instruction decoder 14 maintains a data path through both shifter 22 and ALU 24. Instruction decoder 14 commands multiplexer 26 to couple the output of shifter 22 to input 46 of ALU 24. Instruction decoder 14 commands multiplexer 28 to couple the output of ALU 20 to input 30 of register file 20. Thus, data flows out second register file output 36 into shifter 22 for the required shifting; the shifted number is then input to ALU input 46, where it is added to the value received at ALU input 44 from first register file output 34. The sum is then fed back to register file 20. This is the conventional way such an instruction is handled.

In general, data processing instructions such as shift plus add are performed in two cycles in dual-cycle mode, as indicated in the "shift≠0, add≠0" subcolumn of the dual-cycle column of the flow table of FIG. 2. In the first cycle, instruction decoder 14 commands multiplexer 28 to couple register input 30 to shift output 42. This leaves ALU 24 out of the data loop, so the state of multiplexer 26 is not important during the first cycle. Preferably, its first input 50 is selected in preparation for the second cycle. At the end of the first cycle, the desired shift is completed.

The desired addition (or other arithmetic-logical operation) is performed during the second cycle in dual-cycle mode. Instruction decoder 14 commands multiplexer 26 to couple the ALU input 46 to the register file output 36. Instruction decoder 14 switches multiplexer 28 so that it connects ALU output 48 to register file input 30 (while disconnecting shifter output 42 from register file input 30. Thus, shifter 22 is out of the data loop in the second cycle. Only the addition (or alternative arithmetic/logical operation) is performed in the second cycle.

The invention provides for handling of special cases to achieve further gains in performance. To this end, the instruction and/or the operands in register file 20 can be examined to determine when an operation does not affect the operand. For example, if the shift amount specified by an instruction is zero, the first cycle of a two cycle instruction can be omitted. Thus, in the first cycle, instruction decoder 14 commands multiplexer 28 to connect register file input 30 to ALU output 48. The addition (only) is performed in the one cycle. This operation is indicated in the "shift=0, add≠0" subcolumn of column 2 of the table of FIG. 2.

Likewise, if the shift is non-zero but the value to which the shifted number is to be added is zero, the second cycle can be omitted as indicated in the "shift≠0, add=0" subcolumn of FIG. 2. If the number to be shifted is zero, or if the shift amount is zero and the value to which the shifted number is to be added is zero, then either the shift or the add cycle can be omitted.

Figure 3:
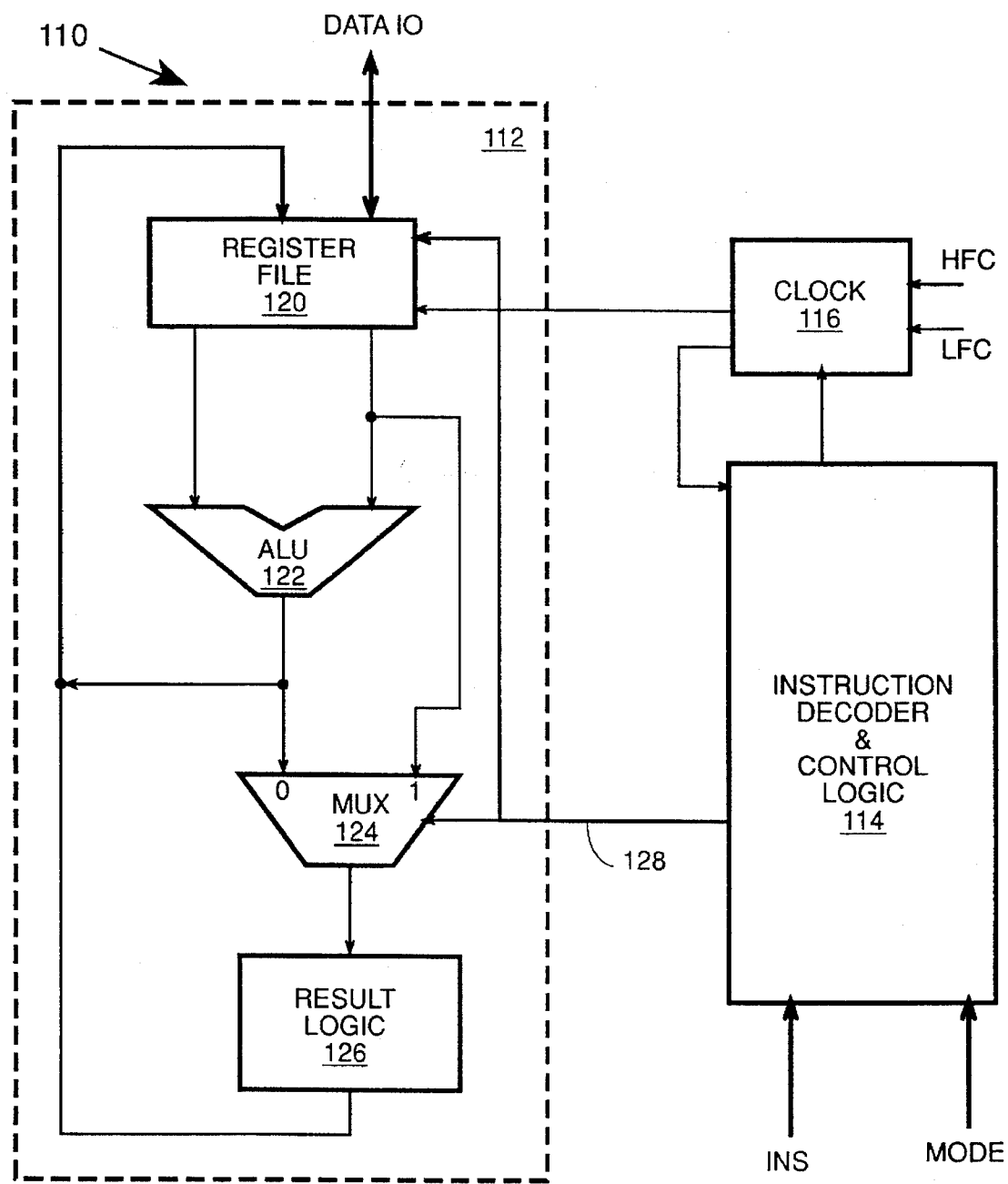
FIG. 3 is a schematic diagram of a second microprocessor in accordance with the present invention.

A second microprocessor 110 in accordance with the present invention, illustrated in FIG. 3, comprises an execution unit 112, an instruction decoder 114, and a clock multiplexer 116. Except as indicated below, the operation of microprocessor 110 is similar to microprocessor 10. In fact, the features of both microprocessors can be combined in a single microprocessor.

Execution unit 112 includes a register file 120, an ALU 122, a multiplexer 124, and result logic 126. Result logic 126 analyzes the number it receives from multiplexer 124 to determine whether or not it is equal to zero and whether it is negative or non-negative. The output of result logic is provided to a flag register of register file 20 when the flag register is enabled by instruction decoder along control bus 128. Instruction decoder 114 controls multiplexer 124, as well as the individual registers of register 120 file via control bus 128.

In a single-cycle mode instruction decoder 114 commands clock multiplexer 116 to select a low frequency clock signal LFC. Instruction decoder 114 also commands multiplexer 124 to couple the input of result logic to the output of ALU 122 and enables the result register and the flag register of register file 120. In the single-cycle mode, the result from ALU 122 is stored in a result register of register file 120, while the zero and sign indicators are set in the flag register of register file 120.

In a dual-cycle mode, instruction decoder 114 commands clock multiplexer 116 to select a high frequency clock signal HFC. When processing an "add plus zero-sum-detection" instruction, decoder 114 commands multiplexer 124 to couple the input of result logic 126 to an output of register file 120 instead of the ALU output.

During a first instruction cycle in dual-cycle mode, the addends are fed from register file 120 to ALU 122. Instruction decoder 114 enables the input to the result register of register file 120, but not the input of the flag register. During the second cycle, the contents of result register are directed to result logic 126. Instruction decoder 114 enables the input to the flag register of register file 120 so that the zero-detection is indicated in register file 120 by the end of the second cycle.

The present invention can be applied generally where instructions involve two or more discrete operations. However, it is not usually desirable to change clock frequencies often within a program. Therefore, the present invention is most valuable when, upon division of an instruction into two cycles, most other instructions in the incorporating instruction set can be performed at the higher clock frequency. The invention is most useful where the operations involved require quite different amounts of execution time so that there is a close tradeoff between single and dual cycle executions. The present invention then allows the programmer or system designer to "fine tune" the final tradeoff. These and other modifications to and variations upon the preferred embodiments are provided for by the present invention, the scope of which is limited only by the following claims.

What is claimed is:

1. A microprocessor system comprising:

clock means for selecting between a relatively high frequency clock signal and a relatively low frequency clock signal;

a first operator unit for executing a first operation, said first operator unit having a first input and a first output;

a second operator unit for executing a second operation, said second operator unit having a second input and a second output;

register means for storing values, said register means having a register input and a register output;

routing means for determining the coupling among said register means and said operator units; and an instruction decoder for decoding a set of instructions including a first instruction calling for sequential execution of said first operation and said second operation, said instruction decoder being coupled to said clock means and said routing means, said instruction decoder having selectable alternative single-cycle and dual-cycle modes, said instruction decoder when decoding said first instruction in said single-cycle mode causing said clock means to select said relatively low frequency clock signal, and said routing means to couple said register output to said first input, said first output to said second input, and said second output to said register input, and when decoding said first instruction in said dual-cycle mode causing said clock means to select said relatively high frequency clock signal, said routing means to couple said register output to said first input and said first output to said register input during a first instruction cycle, and said routing means to couple said register output to said second input and said second output to said register input during a second instruction cycle.

2. A microprocessor system as recited in claim 1 wherein said first operator unit is an arithmetic logic unit and said second operator unit includes a zero detector, said arithmetic logic unit having a third input, said register means having a second register output coupled to said third input, said first instruction calling for an addition with zero-sum detection.

3. A microprocessor system as recited in claim 1 wherein said first operator unit is a shift register and said second operator unit is an arithmetic logic unit having a third input, said register means having a second register output coupled to said third input, said first instruction calling for a non-zero shift followed by addition of two non-zero addends.

4. A microprocessor system as recited in claim 3 wherein when decoding a second instruction involving a zero shift followed by an addition in said dual-cycle mode, said instruction decoder causes said second instruction to be performed in one cycle, said instruction decoder causing said routing means to couple said register output to said second input and said second output to said register input during that one cycle.

5. A microprocessor system as recited in claim 4 wherein when decoding a third instruction involving a non-zero shift followed by an addition of the shifted number to zero in said dual-cycle mode, said instruction decoder executes said third instruction in a single cycle during which it causes said register output to be coupled to said first input and said first output to said register input.

6. A method of operating a microprocessor capable of executing a first instruction involving sequential performance of a first operation and a second operation, the steps of:

selecting between a single-cycle and a dual-cycle instruction mode;

selecting a relatively low clock frequency when said single-cycle mode is selected and selecting a relatively high clock frequency when said dual-cycle mode is selected;

when said single-cycle mode is selected, processing said first instruction in a single cycle; and when said dual-cycle mode is selected, processing first instruction by performing said first operation in a first cycle and said second operation in a second cycle.

7. A method as recited in claim 6 wherein said first operation is an arithmetic logic function and said second operation is a zero detection.

8. A method as recited in claim 6 wherein said first operation is a non-zero shift and said second operation is an addition of the shifted value to a non-zero number.

9. In a method as recited in claim 8 wherein in said dual-cycle mode a second instruction involving a zero shift followed by an addition is performed in one instruction cycle involving addition but no shift.

10. In a method as recited in claim 9 wherein in said dual-cycle mode a third instruction involving a non-zero shift followed by an addition of the shifted number to zero is performed in one instruction cycle involving a shift but no addition.

* * * * *